Aug. 15, 1967     M. LEONARD     3,336,072
SUN VISOR EXTENSION
Filed June 1, 1965
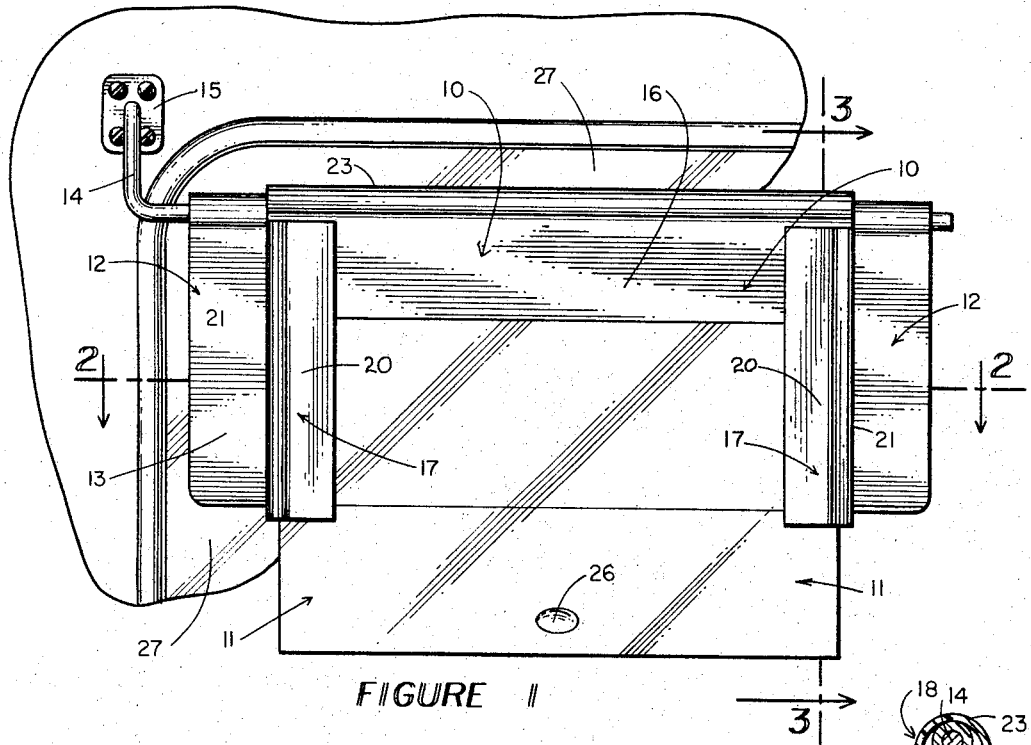
FIGURE 1
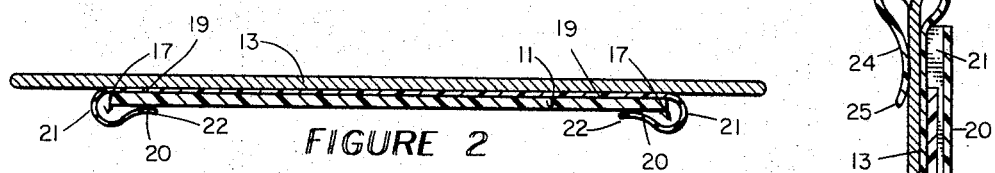
FIGURE 2
FIGURE 3
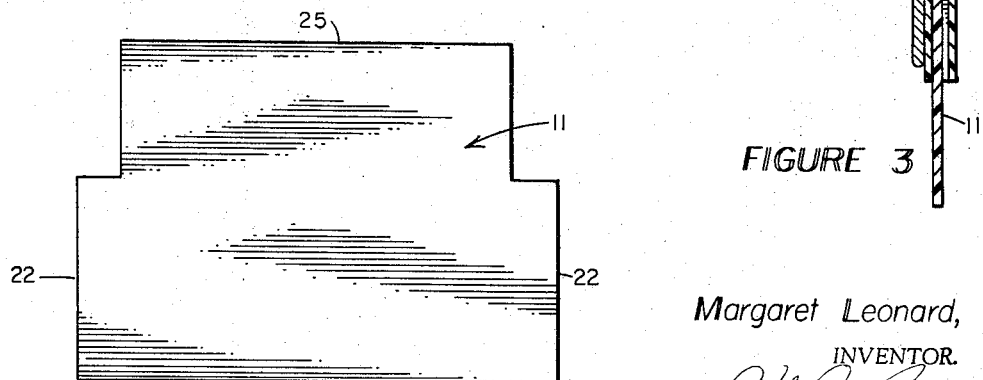
FIGURE 4
Margaret Leonard,
INVENTOR.
BY
ATTORNEY.

United States Patent Office 3,336,072
Patented Aug. 15, 1967

3,336,072
SUN VISOR EXTENSION
Margaret Leonard, 554 N. Central Drive,
Moses Lake, Wash. 98837
Filed June 1, 1965, Ser. No. 460,437
1 Claim. (Cl. 296—97)

ABSTRACT OF THE DISCLOSURE

An automobile sun visor extension having a body releasably, horizontally positionable on the automobile visor and slidably carrying a shield for adjustable vertical extension.

---

This invention relates generally to sun visors for vehicles and more particularly to a device for use in conjunction with existing sun visors that provide an extended shielded area.

Heretofore movable, adjustable sun visors have become almost universally accepted in vehicles to protect the eyes of the vehicle operator or passengers from severe glare by the sun. Such devices as known generally include an opaque, planar shade member movably associated with a mounting member positioned in proximity to the windshield. Generally, the opaque shade member in common sun visors is extensible in a horizontal dimension upon its mounting means, but most generally such shades are not extensible downwardly in a vertical dimension.

When the sun's rays are low on the zenith or when they be reflected from an appropriately positioned surface, it often times is desirable, or necessary, to have a shielding member that extends downwardly further than the normal vehicle sun shade. Since such extended shield may also interfere with the view of a vehicle operator or passenger, it is desirable that it be of a semi-transparent nature so as to interrupt or lessen only the glaring or high intensity rays of the sun but not visual images.

This problem has been considered in the past and solutions have been taught of providing a transparent, downwardly extensible attachment to a sun visor. Such attachments as herefore known have, however, been of a cumbersome and complex nature most generally requiring particular structures for their use and they have been difficult and costly of construction. The instant invention seeks to provide an improvement in such devices consonant with modern materials and manufacturing methods that may be very economically produced and universally applied to the presently existing sun visors.

It is a principal object of my invention to provide an adjustable, semitransparent extension for a vehicle's sun visor of commerce that may be positioned to extend shading functions in either a horizontal or downwardly vertical dimension.

It is a further object of my invention to provide a device of the nature aforesaid that may be universally applied to the sun visors of existing commerce without modification thereof.

It is a still further object of my invention to provide a device of the nature aforesaid that is of new and novel design, consonant with modern materials, and of simple and economic manufacture and rugged and durable nature.

Other and further objects of my invention will appear from the following drawings, specification and claim which form a part of this application.

In the accompanying drawings, wherein like numbers of reference refer to similar parts throughout:

FIGURE 1 is an orthographic front view of my invention in place upon a representative vehicular sun visor of commerce.

FIGURE 2 is an orthographic horizontal cross-sectional view of FIGURE 1, taken on the line 2—2 thereon in the direction indicated by the arrows.

FIGURE 3 is an orthographic vertical cross-sectional view of FIGURE 1, taken on the line 3—3 thereon in the direction indicated by the arrows.

FIGURE 4 is an orthographic view showing the plan of the body or holding part of my invention showing its configuration.

Referring now to the drawings in more detail, and particularly to that of FIGURE 1, it will be seen that my invention comprises a holding member designated generally as 10, slidably carrying the visor extension designated generally as 11. In this illustration the invention is mounted upon a sun visor of commerce commonly used in automobiles and designated generally as 12.

The auto sun visor comprises sheet-like opaque shielding member 13 rotatably and extensibly carried by angle support rod 14, which in turn communicates with fastening brackets 15. The engagement between the upper portion of shielding member 13 and support rod 14 is such that the shielding member may be extended upon the rod and also rotated about it with sufficient friction between such members to maintain them in a desired position after placement. Fastening bracket 15 is positioned in close proximity to the window 27 where shielding is to take place, mostly commonly in vehicles in close proximitly to the upper outer corner of such window.

The holding member 10 of my invention comprises central body part 16 communicating with downwardly disposed paired opposed slide support guides 17 at each of its outer edges and visor support 18 at its uppermost edge.

The slide support guides have a cross-sectional configuration as illustrated in FIGURE 2, with forward part 19 formed by rolling it in a forward direction back upon the rearward part 18. The bend 21 between forward and rearward parts 17, 18 should be sufficiently complete that when a visor extension 11 is inserted between the members, it will be held in this position with sufficient tension to cause appropriate friction between the members. The inwardly extending edge of forward part 19 is preferably slightly upturned, as illustrated, to provide for easy insertion of visor extension 11 therein and manual movement thereof between the parts. Each of the slide support guides 17 are substantially identical except that one is a mirror image or reverse of the other. The two must be so positioned in distance and parallelism relative to each other upon body 16 that visor extension 11 will be frictionally held thereby and manually movable therethrough to any desired position.

Visor support 18 is similarly formed by rolling the upper part of body 16 rearwardly upon itself, as illustrated in FIGURE 3, with the bend 23 such that the rearward projection 24 maintains the member with some friction causing tension upon a standard sun visor 12 of commerce as desired. Again, the lower rear edge of rearward projecting member 24 is preferably turned slightly rearwardly away from the central body part 16 to provide for easier insertion of the holding member upon a sun visor.

The entire holding member 10 is preferably formed from an appropriately shaped piece of rigid semi-elastic plastic, preferably of a variety that softens sufficiently upon heating to be formed and thereafter returns to its previous condition. Other materials having like or similar properties may also serve the purposes of my invention but it is ideally suited to plastic of the thermal forming variety. Obviously, the material must have some rigidity and some elasticity so that it will maintain its position upon a sun visor and frictionally support visor extension 12 in a predetermined position. The member may be formed by injection moulding but this process is somewhat more complex and costly than thermal formation.

In physical shape and dimension it is preferable that the holding member 10 be substantially the same size as sun visor 12, though it obviously could be larger or smaller to fit particular needs without departing from the spirit of my invention.

The visor extension 11 is a planar sheet-like member adapted to lessen or completely stop the passage of light therethrough. In some instances it is desirable that this member be completely opaque, but more commonly it is preferable that it be at least semi-transparent and only stop a portion of the light rays passing therethrough so as to eliminate glare but still allow a visual image. This latter function becomes especially desirable when the visor extension 11 is large, as it then occupies a relatively large part of the viewing area of a window and if it be completely opaque, it may not allow sufficient vision through the window. I prefer, therefore, in my invention to fashion the extension 11 from a colored plastic material that prevents passage of only a part of the light therethrough. Many such plastics are well known in the arts but an acrylic or Lucite type plastic with a relatively dense coloring in the blue or green spectral area is especially adaptable in my invention.

The physical dimensions of visor extension 11 must be such as to maintain the member within the opposed side slide support guides 17 between the forward part 19 and rearward part 20. The member should be of such thickness and there should be such tension between the parts 19 and 20 that the visor extension 11 may be manually moved through the slide support guides 17 but yet it will maintain a position in which it is left. This requirement obviously necessitates the use of a plastic material having some elasticity for the various parts of the holding member 10. The materials from which the holding member 10 and visor extension 11 are constructed must also not have such adhesion between them as to prevent this function, either by reason of their physical nature or by reason of electrostatic forces, but yet there must be sufficient friction between the parts to allow movement and positioning as aforesaid.

It is convenient to put slight finger indentation 26 in the lower central portion of visor extension 11 to aid in manual positioning. This finger indenation, if used, should be positioned substantially in the middle of the extension so that no lateral forces will be produced tending to cause the member to bind within the slide support guides 17 when it be moved.

As illustrated in FIGURE 4 and from the device described, it readily can be seen that the member 10 is laterally extensible upon the sun visor 12 and the visor extension 11 is downwardly extensible from the holding member 10 to give a wide range of positionings of this member relative to the windshield to prevent extraneous glare that otherwise would not be stopped by use of the sun visor 12 itself without my invention.

While the foregoing description is necessarily of a detailed specific character so that a specific embodiment of my invention may be clearly set forth as required by law, it is to be understood that various rearrangements of parts, multiplications thereof, and modifications of detail may be made in connection with the invention without departing from its spirit, scope or essence.

Having thusly described my invention, what I desire to protect by Letters Patent, and what I claim is:

An extension sun visor of the nature aforesaid, for attachment upon a standard automobile visor, comprising, in combination:

a flat body member laterally communicating with paired opposed downwardly depending slide guides, each of said slide guides comprising the lateral edge portion of said body turned upon itself to form a lateral guide with tension between adjacent surfaces thereof to yieldably hold a slide member but allow manual manipulation thereof and having an upper visor support, to hold said body upon an automobile visor, comprising the uppermost portion of said body turned upon itself, on the opposite side of said body from said slide guides, to form a yieldable support with tension between the adjacent surfaces thereof to maintain said member in position on said automobile visor, and a sheet-like slide member carried between said paired opposed slide guides, said slide member being opaque to at least part of the visual spectrum of light.

References Cited
UNITED STATES PATENTS

| | | | |
|---|---|---|---|
| 1,567,480 | 12/1925 | Wood | 296—97 |
| 2,120,089 | 6/1938 | Francis | 296—97 X |
| 2,747,926 | 5/1956 | Ralls | 296—97 |

FOREIGN PATENTS

| | | |
|---|---|---|
| 1,285,392 | 1/1962 | France. |

BENJAMIN HERSH, *Primary Examiner.*

J. A. PARKER, *Assistant Examiner.*